Patented Dec. 19, 1950

2,534,235

UNITED STATES PATENT OFFICE 2,534,235

8-HALOXANTHINE SALTS OF DIALKYL-AMINOALKYL TYPE ANTIHISTAMINE BASES

John W. Cusic, Skokie, Ill., assignor to G. D. Searle & Co., Chicago, Ill., a corporation of Illinois No Drawing. Application January 19, 1949, Serial No. 71,763

7 Claims. (Cl. 260—253)

This invention relates to compositions of matter comprising antihistaminic agents and halogenated xanthines, and to processes for preparing the same. In particular it relates to salts of antihistaminic compounds and 8- haloxanthines which contain a hydrogen atom in position 7. Antihistaminic agents are organic bases and 8-haloxanthines which contain a hydrogen atom in position 7 are moderately strong acidic compounds, and therefore it is possible to form definite salts from selected members of these two groups.

This application is a continuation-in-part of my copending applications Serial No. 745,630, filed May 2, 1947, Serial No. 791,456, filed December 12, 1947, and Serial No. 793,754, filed December 24, 1947.

It is widely recognized that antihistaminic agents elicit certain undesirable side reactions and toxic manifestations. The most common effects are dizziness and sleepiness following the administration of the medication. In certain cases there may be nausea and vomiting. Other effects which have been noticed include weakness, narcolepsy, indigestion, coldness of the extremities, exhaustion, irritability, blurred vision, confusion, and in rare instances collapse. The symptoms produced by antihistaminic drugs are often severe enough to warrant reduced dosage or discontinuance of the medication.

It is the object of this invention to produce therapeutic compositions of matter which are relatively free from untoward reactions. A further object is to produce compositions of antihistaminic agents and halozanthines of reduced toxicity. Another object is to produce compositions having enhanced therapeutic efficacy. Other objects will be apparent to those skilled in the art, in view of the disclosure given herein.

I have discovered that salts of antihistaminic agents with haloxanthines produce little effect on the central nervous system and are therapeutically more useful than any of the individual components alone. The salts of antihistaminic agents and haloxanthines exert a potentiating effect and show enhanced activity in combatting the effects of histamine. As such they are especially useful in the treatment of anaphylaxis and of allergic disorders.

Certain of the compositions within the scope of my invention are so free from undesirable side effects that they may actually be used suppressing those undesirable symptoms commonly elicited by the usual antihistaminic drugs. For instance, my compounds can be used to prevent or alleviate nausea, motion sickness, dizziness and other distressing reactions.

Among the antihistaminic compounds which are within the purview of this invention are the following:

β-dimethylaminoethyl benzohydryl ether
N-p-methoxybenzyl-N - β - dimethylaminoethyl-α-aminopyridine
N-β-dimethylaminoethyl-N-benzylaniline
N-β-dimethylaminoethyl-N-ethylaniline
N-β-dimethylaminoethyl-N-benzyl-α-aminopyridine
10-β-dimethylaminoethylphenothiazine
10-β-dimethylaminoethylacridan
β-diethylaminoethyl fluorene-9-carboxylate
β-dimethylaminoethyldiphenylcarbinol
β-dimethylaminoethyl phenyl - α - pyridylmethyl ether
10-β-diethylaminoethylthioxanthene
β-dimethylaminoethyl 9,10 - dihydro - 9 - anthryl ketone
N-β-dimethylaminoethyl - N-benzyl - 2 - aminopyrimidine
10-β-dimethylaminoethylthioxanthene
9-β-dimethylaminoethyl-9,10-dihydroanthracene
10-β-dimethylaminoethylxanthene
β-diethylaminoethyl 9,10 - dihydroanthracene-9-carboxylate
β-diethylaminoethyl benzohydryl ether
β-dimethylaminoethyl 9,10-dihydroanthracene-9-carboxylate
β-dimethylaminoethyl-9,10 - dihydro-9-anthryl-carbinol
Benzohydryl β-diethylaminopropionate
β-chloroethyldibenzylamine
N-β-dimethylaminoethyl - N - α - thienylmethyl-α-aminopyridine
Papaverine
β-dimethylaminoethyl phenyl-α-thienylglycolate
1-α-pyridyl-1-phenyl-3-dimethylaminopropane
2-(phenylbenzylaminomethyl)-imidazoline
β-dimethylaminoethyl 1-α-pyridyl-1-phenylethyl ether
N-β-dimethylaminoethyl-N - benzyl - 2 - aminothiazole
β-dimethylaminoethyl o-benzylphenyl ether
N,N-dimethyl-N'-p - methoxybenzyl - N' - (2-pyrimidyl) ethylenediamine
N,N-dimethyl-N' - phenyl - N' - (2-thenyl) ethylenediamine
N,N-dimethyl-N' - α - pyridyl - N' - (5-chloro-2-thenyl) ethylenediamine
N,N-dimethyl-N' - α - pyridyl - N' - (5-bromo-2-thenyl) ethylenediamine
10-(β-pyrrolidinoethyl) phenothiazine
10-(2-imidazolylmethyl) phenothiazine
2-(benzhydryloxymethyl) imidazoline
2 - methyl - 9 - phenyl - 2,3,4,9 - tetrahydro - 1-pyridindene Also included are related compounds wherein similar dialkylaminoalkyl groups, such as diethylaminopropyl, dipropylaminoisopropyl, methylethylaminoethyl, 1-methylpropylamino - 2-butyl, morpholinoethyl, piperidinopropyl, pyrrolidinoethyl, methylpiperidinoisopropyl, 1 - dimethylpiperidino-2-propyl, 2-dimethylaminopropyl, β-

[(β-hydroxyethyl)methylamino]ethyl, γ-[(β-hydroxyethyl)methylamino]propyl, β-[(β-hydroxyethyl)methylamino]propyl, β-[(β-hydroxyethyl)ethylamino]ethyl, β-[(β,γ-dihydroxypropyl)-methylamino]ethyl, and the like, are substituted for diethylaminoethyl and dimethylaminoethyl groups of the aforesaid antihistaminic substances.

The halogenated xanthines to which this invention pertains are compounds such as the chloro and bromo derivatives of theophylline, and related xanthines which contain a hydrogen atom in position 7. In particular the invention is concerned with acidic xanthines such as 8-chlorotheophylline
8-bromotheophylline
8-chloroxanthine
3-methyl-8-chloroxanthine
8-bromoxanthine
8-bromotheophylline
3-methyl-8-chloroxanthine
1,3-diethyl-8-bromoxanthine
1,3-diethyl-8-chloroxanthine Compositions of antihistaminic agents and haloxanthines are prepared by dissolving an antihistamine base in a suitable solvent and treating the resulting solution with a solution of a halogenated xanthine. Solvents which are satisfactory for this reaction include the lower alcohols and ketones and their mixtures with water, ethers and hydrocarbons. The desired salt crystallizes out of the solution on chilling or standing, or may be precipitated by addition of a solvent such as ether or benzene.

The following examples illustrate in more detail my invention, but in no way are to be construed as limiting it in spirit or in scope.

Example 1

8 grams of β-dimethylaminoethyl benzohydryl ether and 7 g. of 8-chlorotheophylline are thoroughly mixed. The mixture becomes warm, indicating chemical reaction. It is dissolved in about 50 cubic centimeters of hot alcohol and allowed to cool slowly. Crystals of the β-dimethylaminoethyl benzohydryl ether salt of 8-chlorotheophylline separate; melting point 103–104° centigrade.

Using 8-bromotheophylline in place of 8-chlorotheophylline, there is obtained the dimethylaminoethyl benzohydryl ether salt of 8-bromotheophylline; M. P. 112–113° C.

Example 2

19 g. of 10-β-dimethylaminoethylphenothiazine is dissolved in the minimum of warm alcohol. 12 g. of 8-chlorotheophylline is added with sufficient water to effect solution. The resulting dilute alcoholic solution is chilled and crystals of 10-β-dimethylaminoethylphenothiazine salt of 8-chlorotheophylline separate. An analysis of a sample of this salt showed 7.26 per cent of chlorine and 6.67% of sulfur. The calcuated percentages are respectively 7.31 and 6.61.

A similar experiment using 8-bromotheophylline in place of 8-chlorotheophylline results in the separation of crystals of the 10-β-dimethylaminoethylphenothiazine salt of 8-bromotheophylline; M. P. 167–168° C.

Example 3

30 g. of 8-β-dimethylaminoethylacridan is dissolved in the minimum amount of warm alcohol. 15 g. of 8-chlorotheophylline is added, with sufficient water to dissolve the resulting salt. The dilute alcoholic solution is chilled and diluted with ether, resulting in crystals of the 10-β-dimethylaminoethylacridan salt of 8-chlorotheophylline. Analysis of a sample of this salt showed 7.46% of chlorine; the theoretical value is 7.59%.

Example 4

A mixture of 15 g. of N-dimethylaminoethyl-N-benzyl-α-aminopyridine and 10 g. of 8-chlorotheophylline is dissolved in 75 cc. of hot alcohol and 25 cc. of hot water. The solution thus formed is refrigerated and after dilution with ether the N-β-dimethylaminoethyl-N-benzyl-α-aminopyridine salt of 8-chlorotheophylline separates as a light yellow viscous oil which is soluble in water. The aqueous solution of the salt forms a precipitate when treated with acid or alkali. The oily salt is dried at about 65° C. for several days during which time it partially crystallizes. It is further dried in a desiccator at room temperature and is converted into crystals which melt at 106–108° C.

In a similar way, using 8-bromotheophylline in place of 8-chlorotheophylline, one can prepare the N-β-dimethylaminoethyl-N-benzyl-α-aminopyridine salt of 8-bromotheophylline.

Example 5

80 g. of 10-β-dimethylaminoethylthioxanthene and 16 g. of 8-chlorotheophylline are dissolved in 350 cc. of hot ethanol containing 50 cc. of water. On chilling the crystalline 8-chlorotheophylline salt of 10-β-dimethylaminoethylthioxanthene separates. This salt melts at 182–184° C.

Example 6

26 g. of 9-β-dimethylaminoethyl-9,10-dihydroanthracene and 20 g. of 8-chlorotheophylline are dissolved in 50 cc. of hot methyl ethyl ketone containing 5 cc. of water. On cooling a precipitate of the crystalline 9-β-dimethylaminoethyl-9,10-dihydroanthracene 8-chlorotheophylline salt forms. This salt melts at 185–187° C.

Example 7

7 g. of papaverine and 4 g. of 8-chlorotheophylline are dissolved in a hot mixture of 100 cc. of methyl ethyl ketone, 30 cc. of water, and 10 cc. of alcohol. The hot solution is filtered and evaporated. The residue of the papaverine salt of 8-chlorotheophylline is crystallized at room temperature and melts at 141–143° C.

Example 8

82 g. of β-diethylaminoethyl benzohydryl ether and 70 g. of 8-chlorotheophylline are dissolved in 350 cc. of hot methyl ethyl ketone. The resulting solution is filtered and evaporated on the steam bath until crystallization occurs. The crystalline β-diethylaminoethyl benzohydryl ether salt of 8-chlorotheophylline is removed by chilling and filtration, and is washed with cold methyl ethyl ketone and dried.

Example 9

15 g. of 10-β-(β-hydroxyethylmethylamino)-ethylphenothiazine and 10 g. of 8-chlorotheophylline are dissolved in 100 cc. of hot methyl ethyl ketone containing 25 cc. of water. The hot solution is treated with decolorizing charcoal, filtered and cooled. Ether is added until an oily precipitate of the 8-chlorotheophylline salt of 10-β-(β-hydroxyethylmethylamino)ethylphenothiazine separates. This oil is removed and dried at 65° C. It forms crystals melting at 135–140° C.

*Example 10*

12 g. of β-dimethylaminoethyl phenyl-α-pyridylmethyl ether and 8 g. of 8-chlorotheophylline are dissolved in 100 cc. of hot methyl ethyl ketone. The solution is filtered and ether is added to the chilled filtrate until a precipitate of 8-chlorotheophylline salt of β-dimethylaminoethyl phenyl-α-pyridylmethyl ether forms. A sample of this product on analysis showed 7.32% nitrogen (calculated 6.83%).

*Example 11*

10 g. of 1,1-diphenyl-3-dimethylamino-1-propanol and 6 g. of 8-chlorotheophylline are dissolved in 75 cc. of hot methyl ethyl ketone, containing 50 cc. of water. The hot solution is filtered and evaporated and a residue of 8-chlorotheophylline salt of 1,1-diphenyl-3-dimethylamino-1-propanol is thus obtained.

*Example 12*

6 g. of 1-α-pyridyl-1-phenyl-3-dimethylaminopropane and 5.3 g. of 8-chlorotheophylline are dissolved in 50 cc. of hot methyl ethyl ketone containing 2 cc. of water. The solution is then evaporated on the steam bath and the residue is dried in a desiccator. The solid 1-α-pyridyl-1-phenyl-3-dimethylaminopropane salt of 8-chlorotheophylline is triturated with ether, filtered and dried. It melts at 92–99° C.

*Example 13*

6 g. of 1-α-pyridyl-1-phenyl-3-dimethylaminopropane and 6.4 g. of 8-bromotheophylline are reacted in 50 cc. of hot methyl ethyl ketone and 2 cc. of water as above. The resulting 1-α-pyridyl-1-phenyl-3-dimethylaminopropane 8-bromotheophylline salt is isolated as above. It melts at 73–85° C. A sample on analysis showed 16.84 and 16.90% nitrogen (calculated 16.83%).

*Example 14*

21 g. of benzo hydryl β-(N-β-hydroxyethylmethylamino)ethyl ether and 20 g. of 8-chlorotheophylline are dissolved in the minimum amount of warm aqueous methyl ethyl ketone and filtered. The filtrate is chilled and crystals of the 8-chlorotheophylline salt of benzohydryl β-(N-β-hydroxyethyl-methylamino)ethyl ether separate. These are removed and dried, and melt at 225–230° C.

The subject matter of Examples 1 and 8 is disclosed and claimed in my copending application Serial No. 82,284, filed March 18, 1949, now U. S. Patent No. 2,499,058, granted February 28, 1950. The subject matter of Example 2 is disclosed and claimed in my copending application Serial No. 94,737, filed May 21, 1949. The subject matter of Example 4 is disclosed and claimed in my copending application Serial No. 132,411, filed December 10, 1949. The subject matter of Example 9 is disclosed and claimed in my copending application Serial No. 793,754, filed December 24, 1947, now U. S. Patent No. 2,512,520, granted June 20, 1950. The subject matter of Example 10 is disclosed and claimed in my copending application Serial No. 102,957, filed July 2, 1947. The subject matter of Examples 12 and 13 is disclosed and claimed in my copending application Serial No. 125,660, filed November 4, 1949. The subject matter of Example 14 is disclosed and claimed in my copending application Serial No. 791,456, filed December 12, 1947. The haloxanthine salts of β-dimethylaminoethyl o-benzylphenyl ether are disclosed and claimed in my copending application Serial No. 93,415, filed May 14, 1949. The haloxanthine salts of N-β-dimethylaminoethyl-N-α-thienylmethyl-α-aminopyridine and halogenated derivatives thereof are disclosed and claimed in my copending application Serial No. 103,530, filed July 7, 1949. The haloxanthine salts of N,N-dimethyl-N'-phenyl-N'-(2-thenyl)ethylenediamine are disclosed and claimed in my copending application Serial No. 123,541, filed filed October 25, 1949. The haloxanthine salts of 2-methyl-9-phenyl-2,3,4,9-tetrahydro-1-pyridindene are disclosed and claimed in my copending application Serial No. 125,155, filed November 2, 1949. The haloxanthine salts of 2-(phenylbenzylaminomethyl)-imidazoline are disclosed and claimed in my copending application Serial No. 127,800, filed November 16, 1949. The haloxanthine salts of N,N-dimethyl-N'-p-methoxybenzyl-N' - (2 - pyridyl)ethylenediamine are disclosed and claimed in my copending application Serial No. 139,969, filed January 21, 1950. The haloxanthine salts of β-morpholinoethyl benzohydryl ether and of β-piperidinoethyl benzohydryl ether are disclosed and claimed in my copending application Serial No. 139,970, filed January 21, 1950.

I claim:

1. A salt of an organic base and an 8-haloxanthine which contains a hydrogen atom in position 7, said organic base being a member of the group of anti-histaminic agents consisting of 8-di(lower alkyl)amino-lower-alkyl-acridans, 10-di(lower alkyl)amino-lower-alkylthioxanthenes, 9-di(lower alkyl)amino - lower-alkyl-9,10-dihydroanthracenes and 1,1-di(monocyclic aryl)-3-di(lower alkyl)amino-lower-1-alkanols.

2. An 8-halotheophylline salt of a 1,1-di(monocyclic aryl)-3-di(lower alkyl)amino-lower-1-alkanol.

3. An 8-halotheophylline salt of a 9-di(lower alkyl)amino-lower - alkyl - 9,10 - dihydroanthracene.

4. An 8-halotheophylline salt of 1,1-diphenyl-3-dimethylamino-1-propanol.

5. The 8-chlorotheophylline salt of 1,1-diphenyl-3-dimethylamino-1-propanol.

6. An 8-halotheophylline salt of 9-β-dimethylaminoethyl-9,10-dihydroanthracene.

7. The 8-chlorotheophylline salt of 9-β-dimethylaminoethyl-9,10-dihydroanthracene.

JOHN W. CUSIC.

REFERENCES CITED

The following references are of record in the file of this patent:

FOREIGN PATENTS

| Number | Country | Date |
| --- | --- | --- |
| 418,404 | Great Britain | Oct. 24, 1939 |
| 690,488 | Germany | Apr. 26, 1948 |

OTHER REFERENCES

Levene et al.: Nucleic Acids, page 124 (1931 edition).

Halperin: Squibb Abstract Bulletin 18 (1945), page 1471.

Hartman: Calif. Medicine 66 242–248 (1947).

Klecker, Jr.: Annals of Internal Medicine, pages 583–584, 1948.

Certificate of Correction

Patent No. 2,534,235

December 19, 1950

JOHN W. CUSIC

It is hereby certified that error appears in the printed specification of the above numbered patent requiring correction as follows:

Column 1, line 35, for "halozanthines" read *haloxanthines*; column 5, line 46, for "benzo hydryl" read *benzohydryl*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*